United States Patent
Rey et al.

[11] Patent Number: 5,783,941
[45] Date of Patent: Jul. 21, 1998

[54] TECHNIQUE FOR MAGNETIC ALIGNMENT OF AN OCTANT FOR FUSION TOROIDAL MAGNET

[75] Inventors: Christopher Mark Rey, Lynchburg; Minfeng Xu, Forest, both of Va.

[73] Assignee: The Babcock & Wilcox Company, New Orleans, La.

[21] Appl. No.: 382,360

[22] Filed: Feb. 1, 1995

[51] Int. Cl.⁶ .................................................. G01R 33/02
[52] U.S. Cl. ........................ 324/242; 324/202; 324/244
[58] Field of Search ........................ 324/202, 228, 324/242, 244, 260, 235; 376/131, 132, 133, 142; 313/154; 335/209, 213, 299; 336/229

[56] References Cited

U.S. PATENT DOCUMENTS

| | | | |
|---|---|---|---|
| 3,141,826 | 7/1964 | Friedrichs et al. | 376/123 |
| 3,389,333 | 6/1968 | Wolff et al. | 324/202 |
| 3,619,772 | 11/1971 | Ellis | 324/249 |
| 3,831,121 | 8/1974 | Oster | 335/210 |
| 4,430,290 | 2/1984 | Kiryu | 376/134 |
| 4,849,695 | 7/1989 | Muller et al. | 324/244 |
| 4,857,841 | 8/1989 | Hastings et al. | 324/228 |
| 4,992,696 | 2/1991 | Prueitt et al. | 313/154 |
| 5,126,669 | 6/1992 | Honess et al. | 324/261 |
| 5,327,089 | 7/1994 | Ouellette | 324/345 |
| 5,560,115 | 10/1996 | Fowler | 324/244 |

*Primary Examiner*—Sandra L. O'Shea
*Assistant Examiner*—Jay M. Patidar
*Attorney, Agent, or Firm*—Robert J. Edwards; Michael L. Hoelter

[57] ABSTRACT

Alignment during installation of an octant of a tokamak fusion toroidal magnetic takes place at room temperature or at low operating temperature of the magnet. In order to identify the magnetic center of the magnet, a toroidal magnet octant is electrically powered with equal but opposite flowing current and a spatially known probe is utilized to measure the magnetic field of such a powered octant.

5 Claims, 6 Drawing Sheets

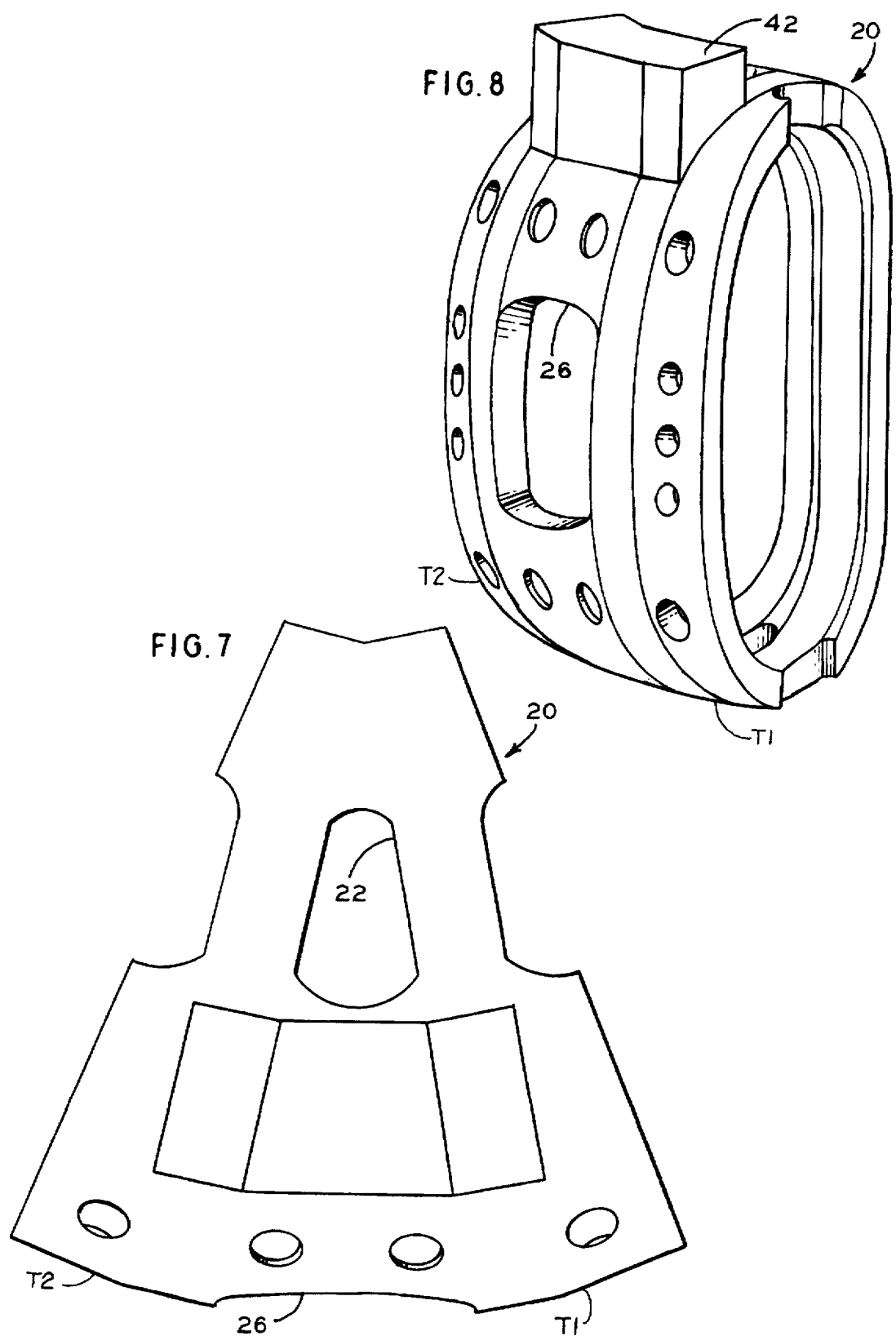

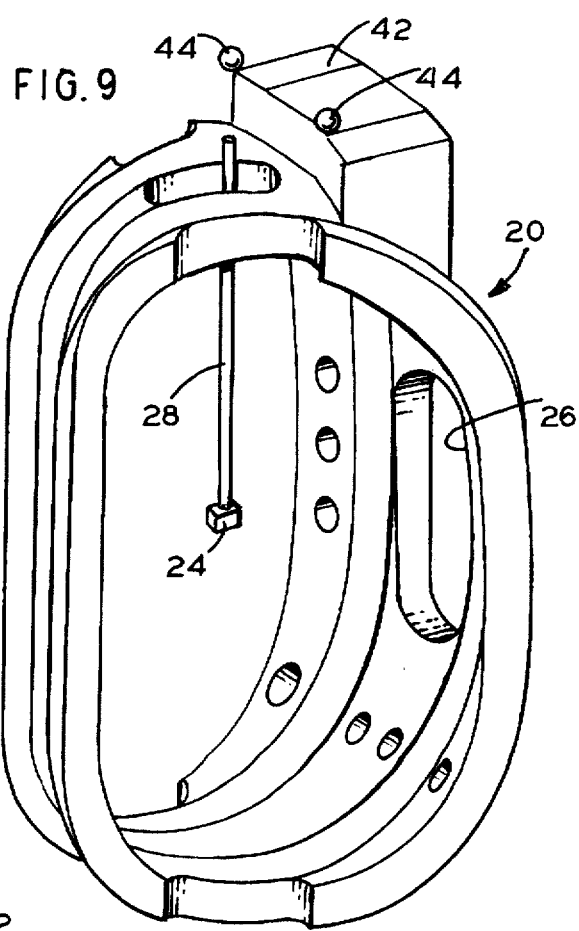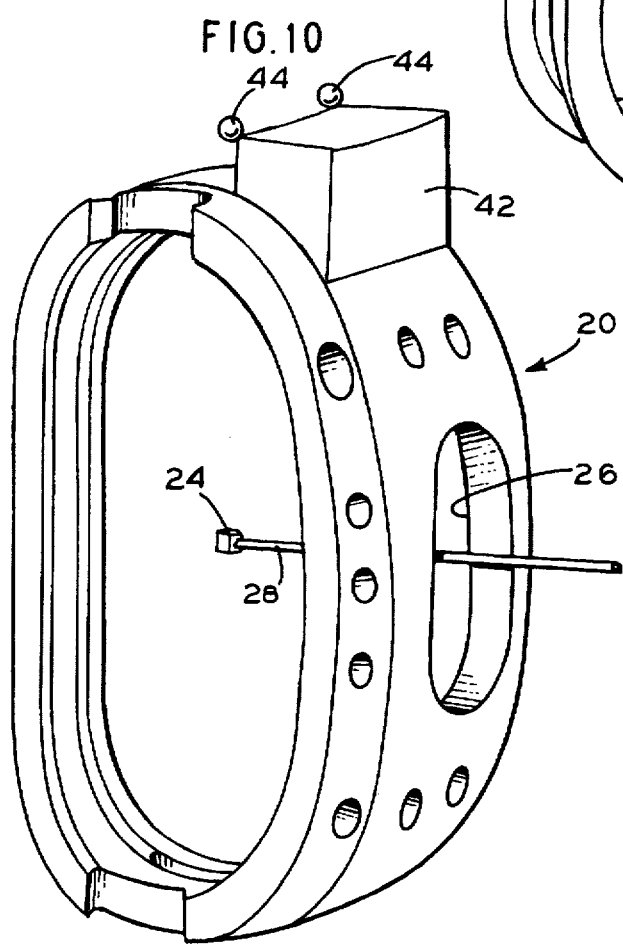

TECHNIQUE FOR MAGNETIC ALIGNMENT OF AN OCTANT FOR FUSION TOROIDAL MAGNET

FIELD AND BACKGROUND OF THE INVENTION

The present invention relates to alignment during installation of an octant or a component of a tokamak fusion toroidal magnet. In order to identify the magnetic center of the entire doughnut-shaped magnet, two individual and adjacent toroidal coils (which comprise a single octant of the magnet) are electrically powered with equal but opposite flowing current. This results in a "quadrupole-like" field in which a magnetic field gradient is established in the powered octant.

It is known to use magnetic fields created by electric currents powered in alternating opposite directions, whose primary purpose is to center or contain a plasma. Specifically, U.S. Pat. No. 3,141,826 to Friedrichs et al., U.S. Pat. No. 4,430,290 to Kiryu and U.S. Pat. No. 4,992, 696 to Prueitt et al. deal specifically with plasma containment.

Other techniques have also been used to determine the magnetic alignment of accelerator quadrupole magnets. One such relevant technique deals with colloidal ferromagnetic solutions. A transparent container of the colloidal solution is placed within the magnetic field. The iron particulates dissolved within the solution will align themselves with the external field. Plane polarized light is then passed through the colloidal solution. Light emerging at the other end will be elliptically polarized with shades of light and dark depending upon the magnetic field orientation. In the case of a perfect quadrupole magnet, the image of Maltese cross will appear. Because of limitations of the ferromagnetic colloidal solution, this technique can presently only be used in high gradient (~3 T/m) magnetic fields.

A similar technique to the ferromagnetic fluid is a magneto-optic film. This technique is also used to measure magnetic alignment in quadrupole accelerator magnets. These films, however, still need to operate at relatively high gradients >2 T/m.

U.S. Pat. No. 3,831,121 to Oster deals primarily with the improvement of the homogeneity of quadrupole fields by use of an electromagnetic pole piece. In contrast, the present invention pertains to the magnetic alignment using quadrupole configurations.

The present invention does not deal with plasma confinement or containment. There is no plasma present when using the technique of this invention. The overall purpose of the present invention is to align two toroidal field coils, which compose a single octant, during installation of the octant into a tokamak reactor. The proposed experimental technique can be used at both room temperature and below, down to operating temperatures (~4 K).

Toroidal fusion magnet alignment during assembly is critical to the ultimate plasma control and confinement during the tokamak reactor's operation. The advantage of the proposed technique is that the magnetic field alignment of the two toroids (within a single octant) can be done with high precision at room temperature during installation where final adjustment is still possible. This precise magnetic measurement will ultimately aid in plasma containment during the tokamak reactor's operation. The proposed technique may also be used at operating temperatures (i.e. with higher currents), however, no plasma would be present.

SUMMARY OF THE INVENTION

The invention is a technique used to magnetically align an octant of a fusion toroidal magnet at both room temperature and operating temperature. The more difficult but more interesting approach is the room temperature technique. The proposed process uses a magnetic measurement probe configuration in the form of cross-hairs, +, of standard magnetic sensors to determine the null magnetic field of an octant or component of a fusion toroidal magnet. The proposed alignment process is performed prior to the two toroids being spliced together to form the octant. In the proposed configuration, each of the two toroids in the octant are electrically powered with equal and opposite current flow. The magnetic field which is thus produced has features that are similar to the magnetic field of quadrupole magnets, however, the field generated by the powered octant is not a quadrupole field. Instead, a "quadrupole-like" field will be created. Because of the positioning of the two toroid coils, the generation of a quadrupole field is not possible. Also, due to the unique field distribution of the powered octant, a magnetic null in the X-Y plane of the octant can be determined with magnetic sensors attached to a measurement probe.

BRIEF DESCRIPTION OF THE DRAWINGS

FIG. 7 is a top view of an octant of a fusion toroidal magnet illustrating a top access port.

FIG. 8 is a front pictorial view of an octant for a fusion toroidal magnet illustrating a front access port.

FIG. 9 is a side pictorial view of an octant for a fusion toroidal magnet illustrating the insertion of a probe through the top access port.

FIG. 10 is a front pictorial view of an octant for a fusion toroidal magnet illustrating the insertion of a probe through the front access port.

DESCRIPTION OF THE PREFERRED EMBODIMENTS

Figure 1:
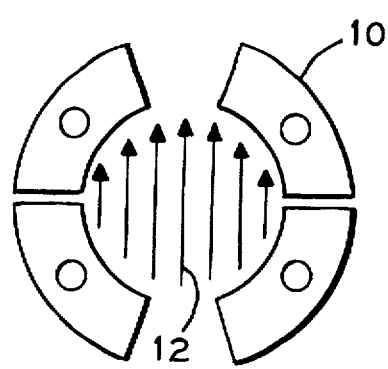
FIG. 1 is a schematic representation of a dipole configured dipole (DCD).
Figure 3:
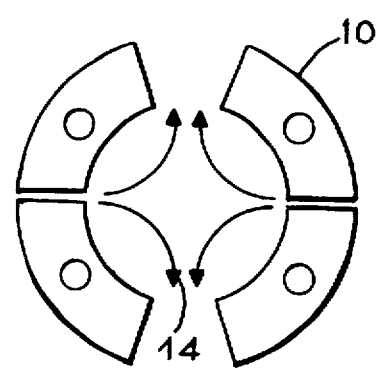
FIG. 3 is a quadrupole configured dipole (QCD).
Figure 2:
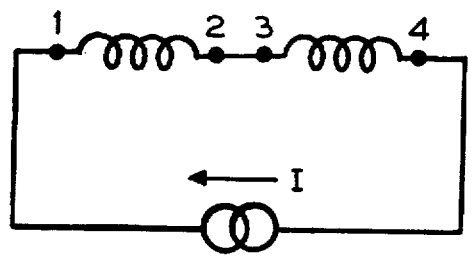
FIG. 2 is a circuit diagram illustrating the powering of the dipole of FIG. 1.
Figure 4:
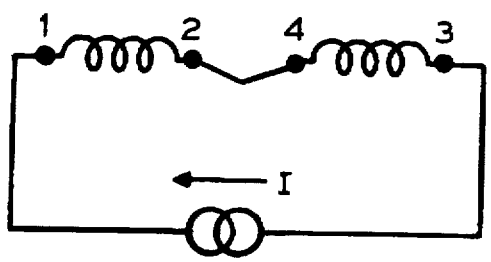
FIG. 4 is a circuit diagram illustrating the powering of the quadrupole of FIG. 3.

The magnetic alignment of the invention, for an octant of a tokamak fusion magnet, is based upon magnetic alignment techniques used on dipole accelerator magnets 10 for the superconducting super collider (SSC). Because of the magnetic field profile 12, as shown in FIG. 1 and configured as shown in FIG. 2, SSC accelerator dipole magnets 10 have no magnetic center. See also A. Devred et al., "Short Course on Harmonics Measurements and BNL Data Processing," Doc.

no. MD-TA-269, presented at the US Particle Accelerator School at UCLA, Jan. 17–21, 1994. As shown in FIG. 4, in contrast to FIG. 2, terminals 3 and 4 of the second coil are reversed with respect to terminals 1 and 2 to generate the quadrupole field 14 of FIG. 3.

In order to align these accelerator magnets 10 with the particle beam line, which will insure a proper bending of the accelerator particle, their magnetic center must be determined. The magnetic center does not necessarily coincide with the mechanical geometric center. The actual magnetic center is determined by the conductor location within the coil.

Several techniques were developed by the SSC to determine the magnetic center of these magnets. By electrically powering the dipole magnets 10 with equal but opposite flowing current, as shown in FIGS. 3 and 4, a quadrupole field 14 could be configured. Unlike a dipole magnetic field 12, a quadrupole magnetic field 14 does have a magnetic center. Many techniques have been used to determine the magnetic center of such quadrupole magnets. In particular, four techniques are related to the present invention. They are listed in the following references: 1) Z. Wolf, "Quadrupole Center Measurements Using A Fluxgate Magnetometer, SSC Document No. MTL-93-002, Jan. 8, 1993, 2) Z. Wolf, "Conceptual Design of a Fluxgate Probe for Quadrupole Center Measurements, SSC Document No. MTL-93-003, 3) A. Wolf, "Moving Wire Technique for SSC Quadrupole Alignment," SSC Document No. MD-TA-209, 4) M. A. Goldman, R. E. Sikora, T. J. Shea, "Preliminary Studies on a Magneto-Optical Procedure For Aligning RHIC Magnets," Prc. Int. Acc. Conf., Washington, DC, 1993, and 5) J. LE Bars and F. Kircher, "New Devices For The Magnetic Center Location of Quadrupole Magnets", CE/SACLAY, DSM/DAPNIA/STCM, Magnet Tech Conf. -13, British Col., Canada, Sep. 1993.

According to the invention, a magnetic measurement probe is attached to an external reference on a transitional X-Y platform. The X-Y platform is used as an external reference and can be located in an inertial reference frame using standard survey techniques. A suggested platform could, for instance, be a commercial Coordinate Measurement Machine (CMM). The choice of magnetic sensor required will depend upon the magnetic field strength and resolution to which the proposed technique is required. Two such magnetic sensors available are a fluxgate magnetometer or a Hall (or micro-Hall) measurement probe. Each device has its own useful operating range of magnetic fields. For very low magnetic field measurements (<5 G) a fluxgate would be the sensor of choice. For moderate magnetic fields (~10 G to 10 kG) a Hall probe would be the sensor of choice. Note, in determining the proposed alignment technique's resolution, one must account for the dimensions of the sensor's active element. Also, this technique is unable to determine the magnetic center in the Z direction because the change in field (i.e. magnetic gradient) is too small in the z direction.

Figure 5:
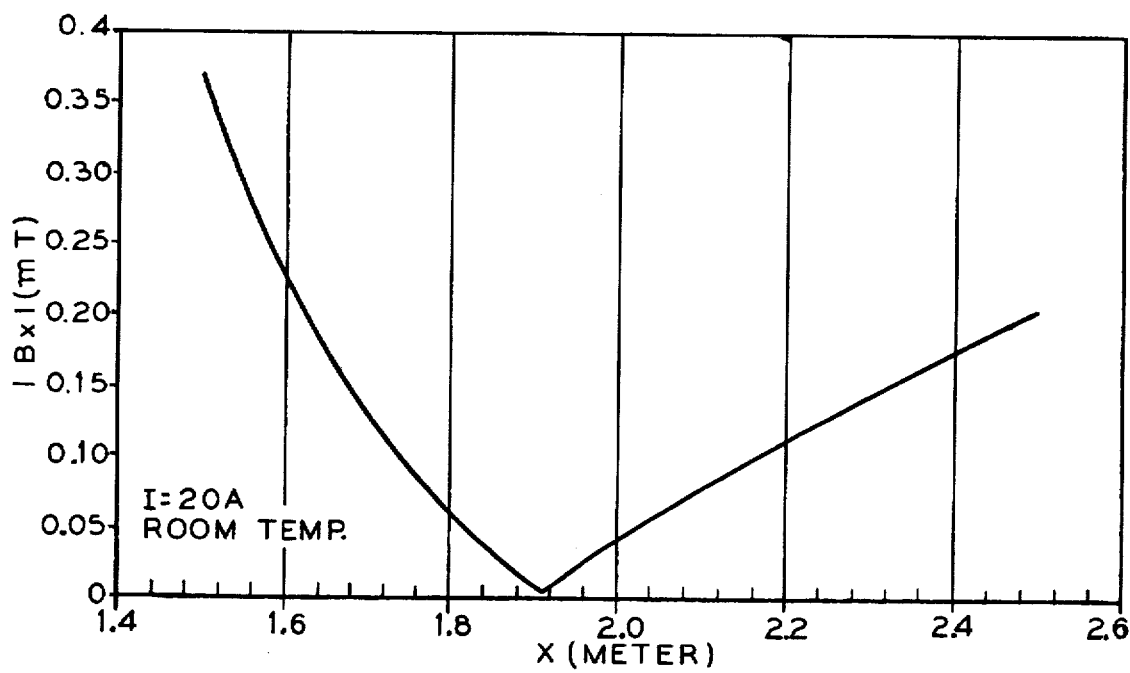
FIG. 5 is a graph plotting the calculated flux density as a function of an x coordinate of an octant. This x axis being defined to pass through the center of the octant in the same direction as rod 28 as shown in FIG. 10 pointing radially outward.
Figure 6:
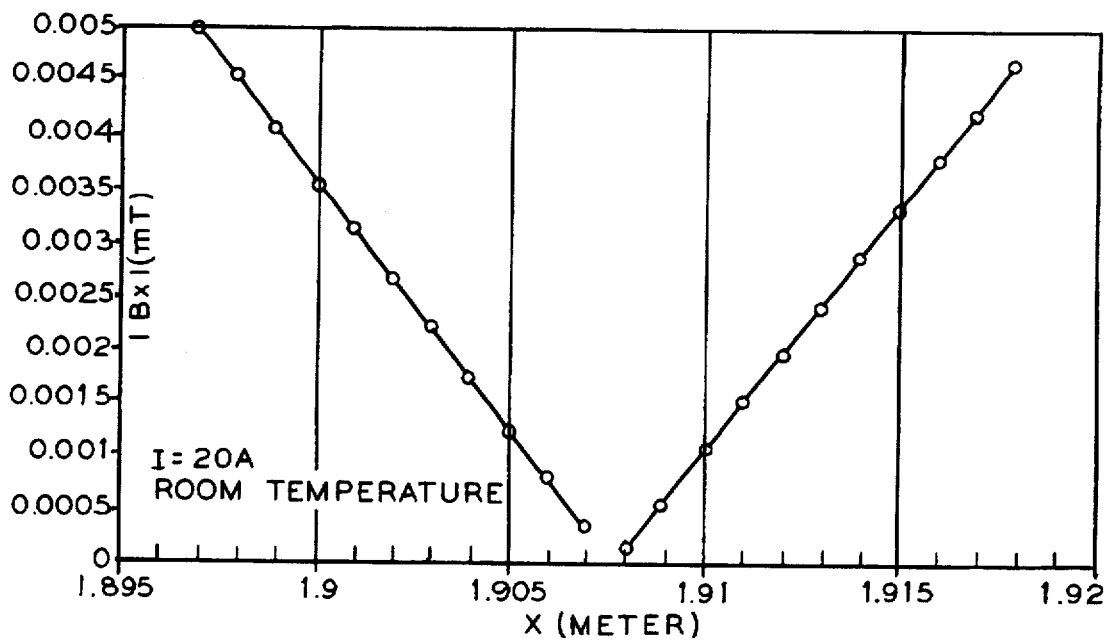
FIG. 6 is a detailed view of the graph of FIG. 5 around the field minimum.

The magnetic field strength to be determined is dependent upon the current flowing within the toroidal coils. The magnitude of the current will be determined by the temperature at which the alignment procedure is being carried out. For example, based upon the conductor cross section and the Cu:Su ratio the superconducting toroidal magnets proposed in the Tokamak Physics Experiment (TPX) can maintain a safe current, at low duty cycle or pulsed currents, of approximately 100 A at room temperature. The calculated magnetic field distribution of an octant of a TPX toroidal magnet electrically powered (at low duty cycle) with equal but opposite current flow of only 20 A is given in FIG. 5 and FIG. 6. Note the magnitude of the magnetic field gradient (well within standard magnetic measurement capability) and the null magnetic signal occurring at approximately 1.9 m from the TPX center. An experimental measurement using the proposed alignment technique would confirm the actual magnetic signature of the magnets relative to its calculated value. Based upon this information the toroid octant could be adjusted to the designed position during the installation of the whole toroidal magnet. The proposed technique can also be applied to measurements made at operating currents (~27–33 kA) and temperatures if access was available. However, care must be taken to screen the measurement electronics from stray magnetic fields and if a different type of magnetic sensor would be employed. In addition, human safety factors must also be accounted for due to the presence of very large stray magnetic fields.

The advantage of the invention is that the actual (not calculated) magnetic signature can be determined using existing commercially available equipment at both room temperature and operating temperatures. The actual magnetic alignment can differ from the calculated because of precision in conductor location. Having the flexibility of determining the magnetic alignment at room temperature can greatly decrease system de-bugging time and thus lower costs. In addition, having the flexibility to magnetically align each of the octants prior to or during installation of the system can also reduce installation costs and long term operation costs. Technically, determination of the magnetic alignment is crucial for maintaining a stable plasma during operation. Plasma stability and confinement which is maintained by the magnetic fields is a necessity for successful operation of a tokamak type fusion machine.

Referring now to FIGS. 7–14, a more detailed illustration of the invention as it applies to a segment or component of a larger toroidal magnet is shown. In this embodiment, the "segment" is octant 20 of the much larger magnet (not shown). Using top access port 22 for the insertion of probe 24 therethrough, the following technique would be followed to align the two toroidal coils T1 and T2 with respect to each other before the insertion of octant 20 within the larger magnet. It should here be noted that similar steps would be followed should it be desired to insert probe 24 through front access port 26 instead.

A typical coordinate measurement machine (not shown) would be placed or referenced with respect to top access port 22 such that its range of motion would be facing downward (i.e. in the negative z direction. As stated above, coordinate measurement machine is a device that can make discrete translations in the x, y, or z directions. Probe 24 would be affixed to this machine according to the manufacturer's directions using a known fixed length of rod 28 and would be inserted through top access port 22. Rod 28 would be made of non-magnetic and preferably non-conducting material.

In order to create the "quadrupole-like" magnetic field 14 with respect to octant 20, a specific current is applied to the two toroids T1 and T2 using an external power supply such as in the manner of FIG. 4. Of course, the level of the current and the length of its duration will depend upon the desired strength of the quadrupole-like field 14. Ideally, one power supply will be used to power both toroids T1 and T2 rather than utilizing two separate power supplies so as to reduce systematic error in measurement. In any event, the key feature is to power the two toroids within octant 20.

Figure 12:
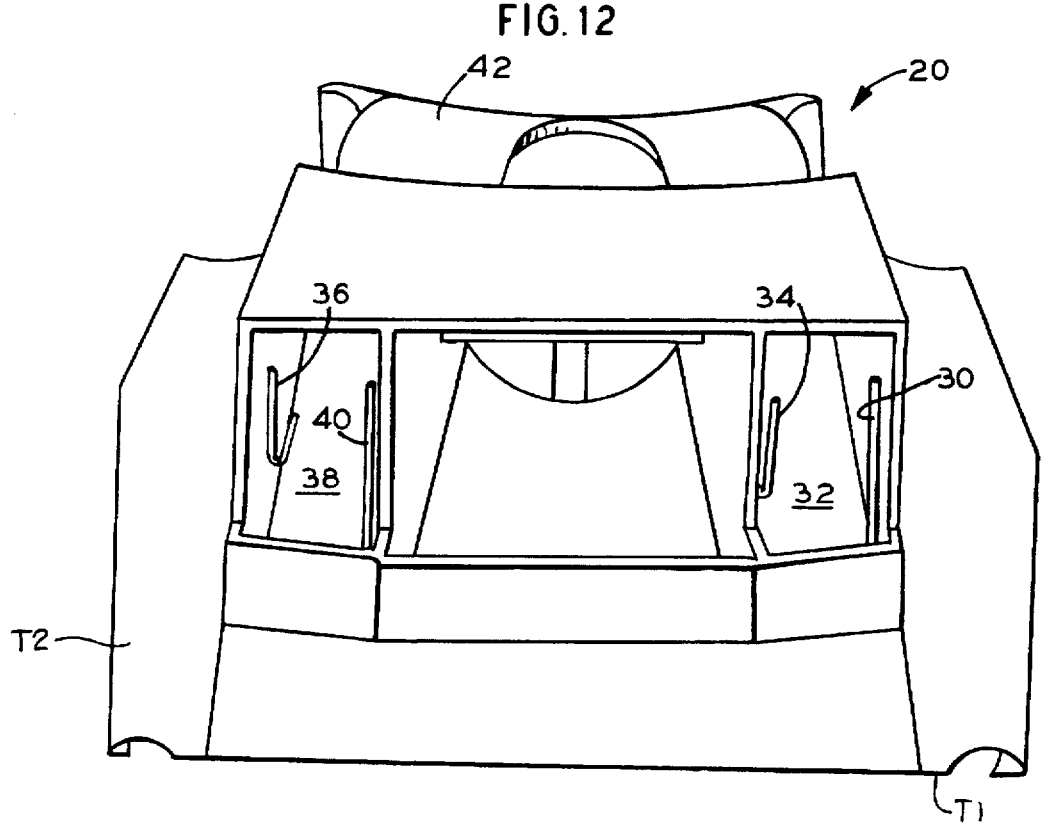
FIG. 12 is an enlarged view of the current lead box with the reference fiducial balls removed for clarity.

In this embodiment, the positive terminal of the power supply is connected to inlet conductor 30 of the toroidal coil winding 32 of T1 (see FIG. 12). Adjacent outlet conductor 34 of T1 is coupled to outlet conductor 36 of coil winding 38 of T2. Consequently, inlet conductor 40 of T2 is coupled to the negative side of the power supply so as to complete the circuit of FIG. 4. These connections would generally be made in current lead box 42.

If, by chance, outlet conductor 34 of T1 were connected to inlet conductor 40 of T2, the resulting magnet would be powered in its normal operating configuration where the magnetic fields of the two toroids would add or be cumulative with respect to each other. This is not to be desired for the proposed alignment technique since it is preferable for the respective magnetic fields to be opposite each other thereby cancelling each other out.

After the above proper connections are made and the power supply is activated, the magnetic field strength at several locations within octant 20 are measured utilizing probe 24. These various measurements are then used to obtain a field profile of octant 20 (see FIG. 5). Of course, the coordinate measurement machine would be used to transfer the location of these measurements made by probe 24 to a fixed reference frame.

Once each toroid T1 and T2 has been powered with equal but opposite currents, their magnetic field will, as indicated above, be measured and mapped at discrete locations. Each such location will have an assigned x-y-z coordinate relative to a fixed spatial reference frame. This fixed spatial reference frame can be set as desired within the limits of the coordinate measurement machine secured with respect to top access port 22. In this manner, each location of the magnetic field measured by probe 24 within octant 20 will be assigned its own unique cartesian coordinates.

This operation is further enhanced by using strategically placed reference fiducials 44 which typically take the shape of spheres. These reference fiducials 44 are generally applied or secured to both the measuring system (i.e. the coordinate measurement machine) and the object (i.e. octant 20) being measured. Standard surveying techniques are then used to define the spatial relation between the two references so that such spatial relation can be used to define the correlation between the various probe measurements. This is most generally accomplished by indexing the coordinate location of probe 24 (via the fiducial reference on the x-y-z stage) and the measured location within octant 20 (via the fiducial reference on the exterior of octant 20) with a fixed reference in space.

Figure 11:
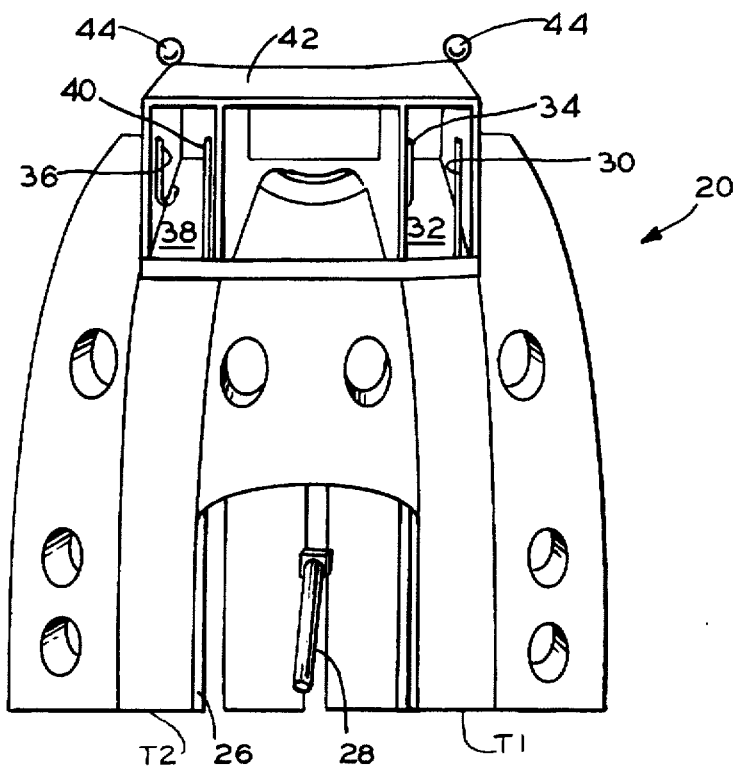
FIG. 11 is a front view of the octant illustrating the current lead box with the probe inserted through the front access port.

Furthermore, it should be noted that such measurements are made prior to splicing the two toroidal coils T1 and T2 together. This allows measurements to be performed at either room or cryogenic temperatures. Also, while the above description is with respect to probe 24 entering octant 20 via top access port 22, the same steps would be followed should probe 24 enter octant 20 via front access port 26. FIG. 9 illustrates probe 24 entering through top access port 22 while FIGS. 10 and 11 illustrate probe 24 entering through front access port 26.

Figure 13:
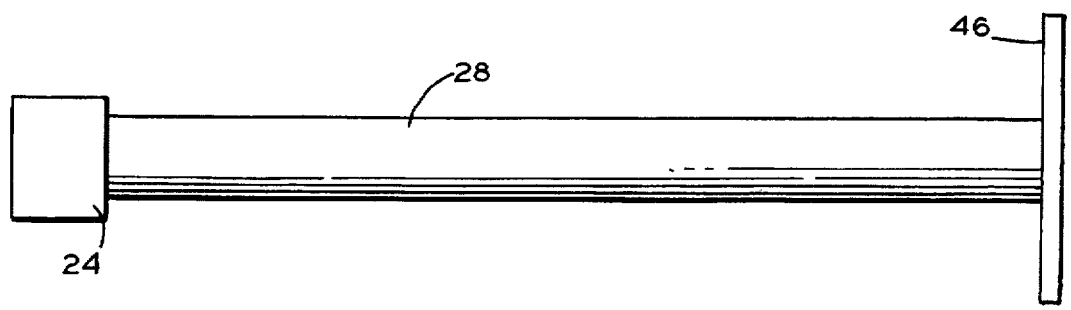
FIG. 13 is a pictorial view of the probe.
Figure 14:
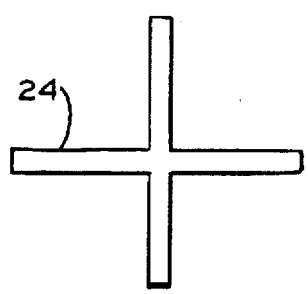
FIG. 14 is a pictorial view of the cross-hairs of the probe.

FIGS. 13 and 14 illustrate probe 24 in greater detail. As indicated earlier, rod 28 of a known length mounts probe 24 to coordinate measurement machine 46 whose location is known with respect to that of octant 20. Of course, the type and choice of probe 24 can vary depending upon the desired spatial and magnetic resolution in addition to the magnetic field strength of powered octant 20. Such typical examples of probe 24 include the Hall probes, micro-Hall probes, fluxgate magnetometers, ferro-fluids, etc.

Ideally, two such probes 24 would be used so as to make measurements perpendicular to each other as shown in FIG. 14. Also, such a cross or cross-hair (+) configuration will permit the magnetic flux lines to be intercepted from two separate directions. Thus, the magnetic sensors of the probes 24 will intercept either transverse or longitudinal flux lines to determine both the X and Y field distribution simultaneously.

Also, with respect to the technique of using ferromagnetic solutions for determining the magnetic alignment of quadrupole magnets, it is possible that with further improvements in the resolution of this colloidal fluid or with an increase in current that can be applied at room temperature (even pulsed currents since the time response of the fluid is ~2 s), such a technique can be modified so as to be used with the present invention.

Furthermore, if an improvement is made in the magnetic characteristics of the films of the magneto-optic technique, or if a higher current can be used (i.e. a fusion magnet other than a TPX), then this optic technique can be modified so as to be used with the process described herein.

While specific embodiments of the invention have been shown and described in detail to illustrate the application of the principles of the invention, it will be understood that the invention may be embodied otherwise without departing from such principles. For example, reference is made herein to an "octant" but the actual magnet assembled need not be in the shape of an octagon but instead can be of any toroidal shape.

What is claimed is:

1. A method for aligning two adjacent segments of a toroidal field magnet with respect to each other, the segments forming a toroidal magnet octant, the method comprising the steps of:

(a) electrically powering each of the two segments with equal and opposite current flow before the segments are spliced to each other, said powered segments generating superimposed magnetic fields in the absence of plasma and at a temperature between cryogenic and room temperature, inclusive, the toroidal field magnets forming a toroid with a plane; and, (b) using a magnetic null locating means to locate a magnetic null for the said superimposed magnetic fields in said plane.

2. A method according to claim 1 further comprising the step of determining said magnetic null using a measurement probe of a magnetic sensor.

3. A method according to claim 1 further comprising the step of applying said current and measuring said magnetic null at room temperature.

4. A method according to claim 1 further comprising the step of applying said current and measuring said magnetic null at cryogenic operating temperatures of the toroidal magnet octant.

5. A method according to claim 1 further comprising the step of determining the magnetic center of the toroidal magnet octant.

* * * * *